F. H. VAN HOUTEN.
MACHINE FOR SPACING LUMPS OF DOUGH.
APPLICATION FILED DEC. 11, 1914.
1,160,792.
Patented Nov. 16, 1915.
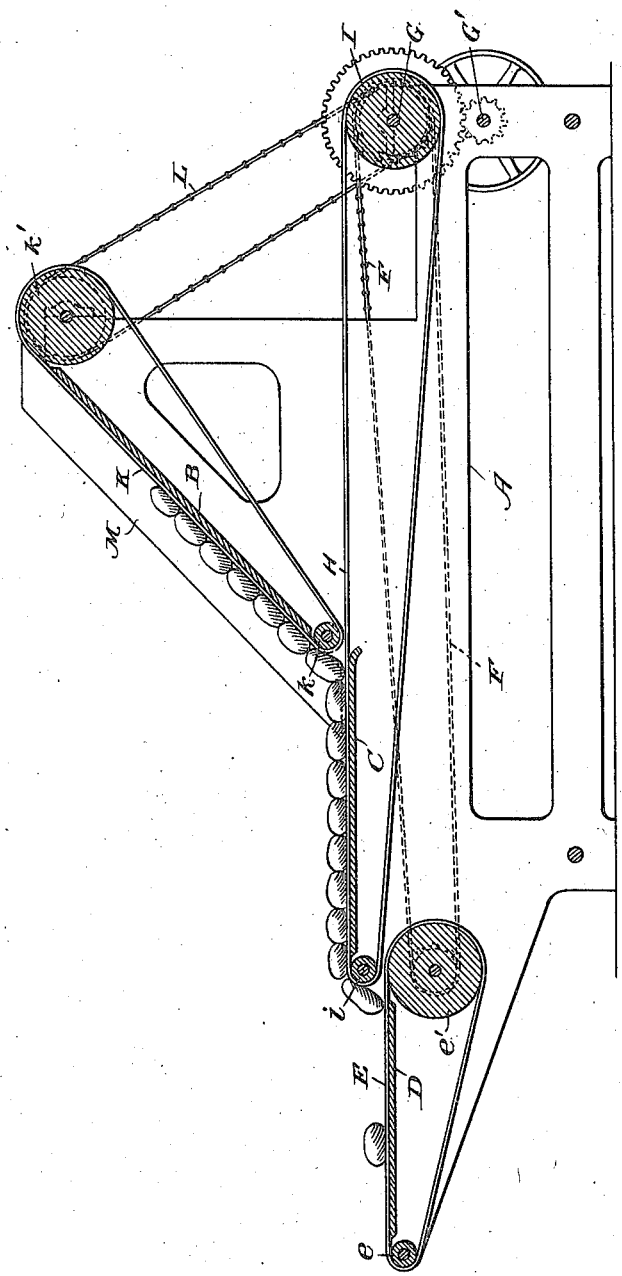

UNITED STATES PATENT OFFICE.

FRANK H. VAN HOUTEN, OF BEACON, NEW YORK, ASSIGNOR TO DUTCHESS TOOL
COMPANY, OF BEACON, NEW YORK, A CORPORATION OF NEW YORK.

MACHINE FOR SPACING LUMPS OF DOUGH.

1,160,792.

Specification of Letters Patent.

Patented Nov. 16, 1915.

Application filed December 11, 1914. Serial No. 876,698.

*To all whom it may concern:*

Be it known that I, FRANK H. VAN HOUTEN, a citizen of the United States, residing at Beacon, in the county of Dutchess and State of New York, have invented a certain new and Improved Machine for Spacing Lumps of Dough; and I do hereby declare the following to be a full, clear, and exact description of the same, reference being had to the accompanying drawings, forming part of this specification, and to the figures and letters of reference marked thereon.

This invention relates to an improved arrangement for spacing lumps of dough of the type disclosed in my co-pending application Serial No. 809,341. In said co-pending application the machine for spacing the lumps of dough embodies a traveling carrier or belt which discharges the lumps of dough from the machine at a uniform speed with a traveling feeder for depositing the lumps of dough on the discharge belt, the said traveling feeder being driven at a speed slower than the discharge belt, and a downwardly moving dough supporting surface for positively feeding and assembling the lumps of dough in an uninterrupted line on the traveling feeder, said supporting surface being formed by one reach of a belt, the other of which forms the traveling feeder. In such a construction the rate of speed of both the traveling feeder and the mechanism for assembling the lumps on the feeder is necessarily the same at all times. I have discovered, however, that in some cases it is desirabe to assemble the lumps of dough on the traveling feeder with a rate of speed somewhat less than the rate of delivery to the discharge or spacing belt. Such an arrangement enhances the advantageous features disclosed in my prior application in that it absolutely secures the arrangement of the lumps of dough in an uninterrupted line on the traveling feeder and absolutely prevents coalescence or sticking together of the lumps during their progress through the machine.

A full understanding of the present invention will be attained from the following detail description taken in connection with the accompanying drawing illustrating a construction embodying the same in a preferred form and pointed out in the appended claims.

In the drawing, the figure discloses a sectional elevation of a dough spacing machine made in accordance with the present invention.

The machine embodies a frame A which may be of any suitable construction adapted to rest on the floor of the bakery and support in substantially stepped relation to each other, an incline B, a substantially horizontal table C below the incline, and a second substantially horizontal table D at a lower level than the table C, all of said parts being arranged in successive alinement as shown in said figure. The table D forms the supporting surface for a discharge belt E which belt passes at its outer end around a guide pulley $e$ and at its inner end around a relatively large drive pullley $e'$. The drive pulley receives its motion through gearing which may be conveniently in the form of a sprocket chain indicated at F passing back to a sprocket wheel on a drive shaft G receiving its motion from a counter shaft G' driven by a belt or other suitable back connection, not shown. A traveling feeder is adapted to pass over and be supported by the table C and to deposit lumps of dough carried thereby directly on the receiving end of the discharge belt E and this traveling feeder conveniently takes the form of a belt H which passes forwardly from a suitable drive pulley I on the shaft G around a small guide pulley $i$, and thence back to drive pulley I.

The dough supporting surface of the incline B is formed by a belt K adapted to travel downwardly over the incline around a relatively small guide pulley or roller K and back to a drive pulley K' which is adapted to receive power from the shaft G by a suitable chain drive indicated at L. The dough supporting surface or belt K is preferably driven with a speed less than the traveling feeder H and carries the lumps of dough placed on the incline downwardly and positively feeds them onto the traveling feeder H, whence they are carried in an unbroken line to the discharge or spacing belt E. To guide the lumps of dough in their downward movement on the supporting surface K over the incline, spaced lateral guides M are mounted above the incline so as to form a trough-like arrangement.

From the foregoing, it will be apparent that the lumps of dough will be carried down the incline both by gravity and the moving dough supporting surface, and positively fed in a substantially uninterrupted line to the traveling feeder. By driving the belt H at a speed slightly greater than the belt K, a slight preliminary separation of the lumps of dough is effected sufficient to prevent them from sticking together, but not great enough to destroy the continuity of the line of lumps on the traveling feeder, since it is important that the lumps be fed to the spacing belt in a substantially uninterrupted line, in order to secure uniform spacing. In addition the greater speed of the belt H will have the effect of separating any lumps of dough which may have temporarily adhered to each other during their period of travel down the incline B. As shown, the belts may all be driven from a single shaft G and the different speeds obtained by the provision of suitable sizes of gearing. In the operation of the present invention, the lumps of dough are discharged from the machine with a uniform spacing and coalescing or sticking together of the dough masses during their travel through the machine, is entirely obviated.

It will be understood that, while I have shown and described a certain specific embodiment of the invention, the same is merely for purposes of illustration and is capable of considerable modification and variation within the scope of the claims.

Having thus described my invention, what I claim as new and desire to secure by Letters Patent is,—

1. In an apparatus for uniformly spacing lumps of dough, the combination of a device for spacing the lumps, a traveling feeder for delivering said lumps directly to the spacing device, and a movable dough supporting surface arranged at an incline above the feeder for positively feeding the lumps of dough in an uninterrupted line on the feeder, the speed of said supporting surface being relatively less than the speed of the feeder to prevent coalescence of the lumps, during their travel through the apparatus.

2. In an apparatus for uniformly spacing lumps of dough, the combination with substantially horizontal tables arranged at different levels, and an incline leading upwardly from the upper table, of a discharge belt traveling over the lower table at a substantially uniform speed, a traveling feeder driven at a uniform speed slower than that of the discharge belt for depositing lumps of dough on the discharge belt, a dough supporting surface over the incline for positively feeding and assembling the lumps of dough in an unbroken line on the traveling feeder, and means for driving the dough supporting surface at a uniform speed less than that of the traveling feeder.

FRANK H. VAN HOUTEN.

Witnesses:
ANNA F. DEVEREAUX,
WM. T. STRIPPEL.